(12) United States Patent
Thornton

(10) Patent No.: US 7,680,729 B2
(45) Date of Patent: Mar. 16, 2010

(54) EDUCATION PLANNING

(75) Inventor: Taige P. Thornton, Edina, MN (US)

(73) Assignee: Northstar Capital Markets Services, Inc., St. Paul, MN (US)

( * ) Notice: Subject to any disclaimer, the term of this patent is extended or adjusted under 35 U.S.C. 154(b) by 1060 days.

(21) Appl. No.: 11/358,321

(22) Filed: Feb. 21, 2006

(65) Prior Publication Data

US 2007/0196794 A1 Aug. 23, 2007

(51) Int. Cl.
*G06Q 40/00* (2006.01)
(52) U.S. Cl. ....................................................... 705/38
(58) Field of Classification Search .................. 705/38, 705/36 R, 36
See application file for complete search history.

(56) References Cited

U.S. PATENT DOCUMENTS

| | | | |
|---|---|---|---|
| 4,752,877 A * | 6/1988 | Roberts et al. ............ | 705/36 R |
| 5,745,885 A | 4/1998 | Mottola et al. | |
| 5,809,484 A | 9/1998 | Mottola et al. | |
| 6,064,984 A | 5/2000 | Ferguson et al. | |
| 6,408,309 B1 | 6/2002 | Agarwal | |
| 6,424,952 B1 | 7/2002 | Yinbal | |
| 6,850,897 B2 | 2/2005 | Paquette | |
| 7,158,950 B2 * | 1/2007 | Snyder ......................... | 705/35 |
| 2001/0044765 A1 | 11/2001 | Wolberg | |
| 2002/0123949 A1 | 9/2002 | VanLeeuwen | |
| 2002/0133460 A1 * | 9/2002 | Field ........................... | 705/40 |
| 2003/0097324 A1 | 5/2003 | Speckman | |
| 2003/0187768 A1 | 10/2003 | Ryan et al. | |
| 2003/0225685 A1 * | 12/2003 | Dickerson .................... | 705/38 |
| 2004/0078312 A1 | 4/2004 | Bush et al. | |
| 2004/0236652 A1 | 11/2004 | Heiges et al. | |
| 2005/0171820 A1 * | 8/2005 | Snyder .......................... | 705/4 |
| 2005/0187851 A1 * | 8/2005 | Sant ............................. | 705/36 |
| 2007/0027787 A1 * | 2/2007 | Tripp ........................... | 705/36 |
| 2007/0174163 A1 * | 7/2007 | Griffin ......................... | 705/35 |
| 2007/0203834 A1 * | 8/2007 | Field ............................ | 705/40 |
| 2008/0126140 A1 * | 5/2008 | Sutton ........................... | 705/4 |

OTHER PUBLICATIONS

"Fitch Rates NorthStar Education Finance, Inc.'s Note Issue." Business Wire. New York: Feb. 27, 2004. p. 1.*
Archived pages of Northstar's web site from web.archive.org dated between May 15, 2004 and Jul. 23, 2004, retrieved from [URL: http://web.archive.org/web/.../www.northstar.org/...].*

* cited by examiner

*Primary Examiner*—Susanna M Diaz
(74) *Attorney, Agent, or Firm*—Brooks, Cameron & Huebsch, PLLC

(57) ABSTRACT

Systems and methods are provided for education planning. One method embodiment includes collecting information associated with a cost of obtaining an education and information associated with funding the cost, determining an amount to be financed by using the information associated with the cost and the information associated with funding the cost, and providing a payment plan for financing the amount to be financed, the payment plan including a levelized payment (L) to be made at a number of intervals for a repayment term, wherein the levelized payment is determined by using a net present value (V) associated with more than one funding event over the course of an education program.

22 Claims, 14 Drawing Sheets

$$L = \frac{[A * I * (I+1)^R]}{(M * I + 1) * (I+1)^R - 1}$$

1230

ALLOCATE CURRENT FAMILY RESOURCES AND DETERMINE COSTS NOT FUNDED

DESCRIBE THE FAMILY CASH CONTRIBUTIONS:

| Family Resources | Total | Apply as Needed or Evenly | Year 1 | Year 2 | Year 3 | Year 4 |
|---|---|---|---|---|---|---|
| Student Savings | $5,000 | ○ As Needed / ○ Evenly | $5,000 | $0 | $0 | $0 |
| Student Summer Job | $2,500 | ○ Yearly | $2,500 | $2,500 | $2,500 | $2,500 |
| Non Parent Relatives | $15,000 | ○ As Needed / ○ Evenly | $3,750 | $3,750 | $3,750 | $3,750 |
| Parent College Saving Amount | $20,000 | ○ As Needed / ○ Evenly | $5,000 | $5,000 | $5,000 | $5,000 |
| Total Family Resources | $50,000 | | $16,250 | $11,250 | $11,250 | $11,250 |

| Part B | COST OF EDUCATION AND FINANCIAL AID SUMMARY | | | | | |
|---|---|---|---|---|---|---|
| DETAILS | Allocated Amounts | 09/05-05/06 | 09/06-05/07 EST. | 09/07-05/08 EST. | 09/08-05/09 EST. | 4-Yr Totals EST. |
| | Cost of Education | $34,500 | $36,570 | $38,764 | $41,090 | $150,924 |
| | Grants ☑ All 4 Years | $0 | $0 | $0 | $0 | $0 |
| | Scholarships ☑ All 4 Years | $7,500 | $7,500 | $7,500 | $7,500 | $30,000 |
| | Other Gift Aid ☑ All 4 Years | $0 | $0 | $0 | $0 | $0 |
| | FFEL Subsidized Stafford Loan | $2,625 | $3,500 | $5,500 | $5,500 | $17,125 |
| | FFEL Unsubsidized Stafford Loan | $0 | $0 | $0 | $0 | $0 |
| | Federal Perkins Loan ☑ All 4 Years | $0 | $0 | $0 | $0 | $0 |
| | Institutional Loan ☑ All 4 Years | $0 | $0 | $0 | $0 | $0 |
| | Work Study ☑ All 4 Years | $1,200 | $1,200 | $1,200 | $1,200 | $4,800 |
| | Total Family Contribution | $16,250 | $11,250 | $11,250 | $11,250 | $50,000 |
| | ANNUAL COSTS NOT FUNDED | $6,925 | $13,120 | $13,314 | $15,640 | $48,999 |

HOW MUCH CAN A STUDENT AFFORD TO BORROW?

Please Indicate Student's Major to Determine Student's Debt-To-Income Ratio:

WHAT CAN A STUDENT AFFORD BASED ON FUTURE INCOME? (ESTABLISHING YOUR BORROWING LIMIT)

What's a Degree Worth? Select your degree from list in row #1 to populate avg. starting salary box in row #2

*632*

1. Business Administration
2. Economics/Finance — *635* → $38,254
3. Nursing — $319
4. Business Administration — $28,643
5. Marketing Ratio 10%

*If you don't see your degree listed, type in your est. annual salary here.

Reminder:
Student's educational debt should be 10% or less of his/her anticipated annual income after graduation.

Political Science
English
History
Liberal Arts
Elementary Education
Biology/Life Sciences
Psychology

HOW MUCH CAN A STUDENT AFFORD TO BORROW?

Please Indicate Student's Major to Determine Student's Debt-To-Income Ratio:

WHAT CAN A STUDENT AFFORD BASED ON FUTURE INCOME? (ESTABLISHING YOUR BORROWING LIMIT)

| | | |
|---|---|---|
| 1. What's a Degree Worth? Select your degree from list in row #1 to populate avg. starting salary box in row #2 | [Economics/Finance] ← 632 | *If you don't see your degree listed, type in your est. annual salary here. |
| 2. Average Starting Salary: | 637 → $40,630 | |
| 3. Monthly Loan Payment: | $339 | |
| 4. Total Debt at Graduation: | $30,445 | |
| 5. Est. Student Debt-to-Income Ratio: | 10% | Reminder: Student's educational debt should be 10% or less of his/her anticipated annual income after graduation. |

WHAT PAYMENT OPTIONS ARE AVAILABLE?

PARENT LOAN SECTION

| Loan Type: | Total Amount Borrowed | Repayment Term | Payment Plan |
|---|---|---|---|
| FFEL PLUS Loan | $39,689 (81%) ▼ | 10 Years | Standard Payment Plan [HIDE OPTIONS] |

Available Payment Plans — *list below*

| | Payment Start | Beg Monthly Payment | Ending Monthly Payment | Beginning No. Pmt. | Ending No. Pmt. thru Term | Total Cost |
|---|---|---|---|---|---|---|
| ○ T.H.E. Payment P... | 10/1/2005 | $327 | $327 | $64 | $414 | $52,320 |
| ○ Standard Payment... | 2/1/2006 | $64 | $414 | | | $56,112 |
| ○ Interest Only - In... | 2/1/2006 | $30 | $453 | | | $57,528 |
| ⊙ No Payments In S... | 6/1/2009 | $501 | $501 | | | $60,120 |

*Total Paid: $56,112*

Amount Borrowed

| | School Yr. | Amount |
|---|---|---|
| Anticipated | 1st | $5,609 |
| Estimated | 2nd | $10,627 |
| Estimated | 3rd | $10,764 |
| Estimated | 4th | $12,668 |
| | Estimated Total | $39,689 |

View Details for Above Payment Plans: [HIDE]

T.H.E. Payment Plan | Months | Monthly Payment
| 10/2005 - 02/2019 | 160 | $327 |
| Total Payments | 160 | $52,320 |

Interest Only - In School | Months | Monthly Payment
| 02/2006 - 02/2007 | 12 | $30 |
| 02/2007 - 02/2008 | 12 | $88 |
| 02/2008 - 02/2009 | 12 | $146 |
| 02/2009 - 02/2019 | 120 | $453 |
| Total Payments | 156 | $57,528 |

Standard Payment Plan | Months | Monthly Payment
| 02/2006 - 02/2007 | 12 | $64 |
| 02/2007 - 02/2008 | 12 | $181 |
| 02/2008 - 02/2009 | 12 | $291 |
| 02/2009 - 02/2019 | 120 | $414 |
| Total Payments | 156 | $56,112 |

No Payments in School | Months | Monthly Payment
| 06/2009 - 06/2019 | 120 | $501 |
| Total Payments | 120 | $60,120 |

*Fig. 9*

$$P = \frac{a}{(1+i)^D}$$

*Fig. 12A*

$$L = \frac{-V * I * (I+1)^T}{1 - (I+1)^T}$$

*Fig. 12B*

$$L = \frac{[A * I * (I+1)^R]}{(M * I + 1) * (I+1)^R - 1}$$

*Fig. 12C*

EDUCATION PLANNING

BACKGROUND

Obtaining a college education has become quite expensive and various funding strategies can be used to pay for the expense. Some families plan ahead by saving money prior to a student enrolling in an institution of higher learning using various savings plans including 529 plans. However, many families, including those that have planned ahead, may use various other sources to fund an education including gifts, scholarships, loans, and various other financial aid.

While existing methods and systems focus on providing an estimate of how much a family will borrow to fund an education, these methods and systems do not integrate school, family, and market information to allow a family to determine and evaluate appropriate alternative funding strategies.

BRIEF DESCRIPTION OF THE DRAWINGS

FIG. 4 is another example viewable interface for education planning according to a sequence embodiment of the present disclosure.

FIG. 5 is another example viewable interface for education planning according to a sequence embodiment of the present disclosure.

FIGS. 6A and 6B are example viewable interfaces for education planning according to a sequence embodiment of the present disclosure.

FIG. 7 is another example viewable interface for education planning according to a sequence embodiment of the present disclosure.

FIGS. 8A and 8B are example viewable interfaces for education planning according to a sequence embodiment of the present disclosure.

FIG. 9 is another example viewable interface for education planning according to a sequence embodiment of the present disclosure.

FIGS. 12A-12C illustrate formulas for determining a levelized payment according to an embodiment of the present disclosure.

DETAILED DESCRIPTION

Embodiments of the present disclosure include methods and systems for education planning. For example, a number of embodiments provide a payment plan for funding the cost of obtaining a particular education that includes a payment that is determined based on a net present value over the course of a more than one funding event.

According to various embodiments, program instructions can be executed to determine a difference between the cost of obtaining a particular education and the amount of funds available for paying the cost. Instructions can also be executed to provide a comparison of a number of payment plans for paying a borrowed amount to pay the cost. Instructions can also be executed to update the payment plans based on changes to various factors including how the borrowed amount is allocated among parties.

Embodiments of the present disclosure incorporate financial contributions from sources including the student, the family, the educational institution, and other sources to determine an amount to be borrowed to fund the cost of a particular education. According to various embodiments, instructions can be executed to allow the borrowed amount to be selectably allocated among the parent and student and to allow the financial contributions and/or borrowing allocation to be adjusted. Instructions can also be executed to display various payment plans and automatically update the payment amounts based on adjustments to a number of factors, e.g., funding sources, allocation of borrowed amounts, etc. In this manner, embodiments of the present disclosure can allow a family to determine a suitable strategy for funding a student's education at a particular institution by comparing and evaluating a number of planning options.

Embodiments of the present disclosure described herein can be performed by software and/or firmware (i.e., computer executable instructions), hardware, application modules, and the like, executable and/or resident on systems, ASICs, and devices shown herein or otherwise. The embodiments of the present disclosure are not limited to any particular operating environment or to instructions written in any particular programming language. Software, firmware, and/or processing modules, suitable for carrying out embodiments of the present disclosure, can be resident in one or more devices or locations. Processing modules can include separate modules connected together or several modules on an application specific integrated circuit (ASIC).

Figure 1:
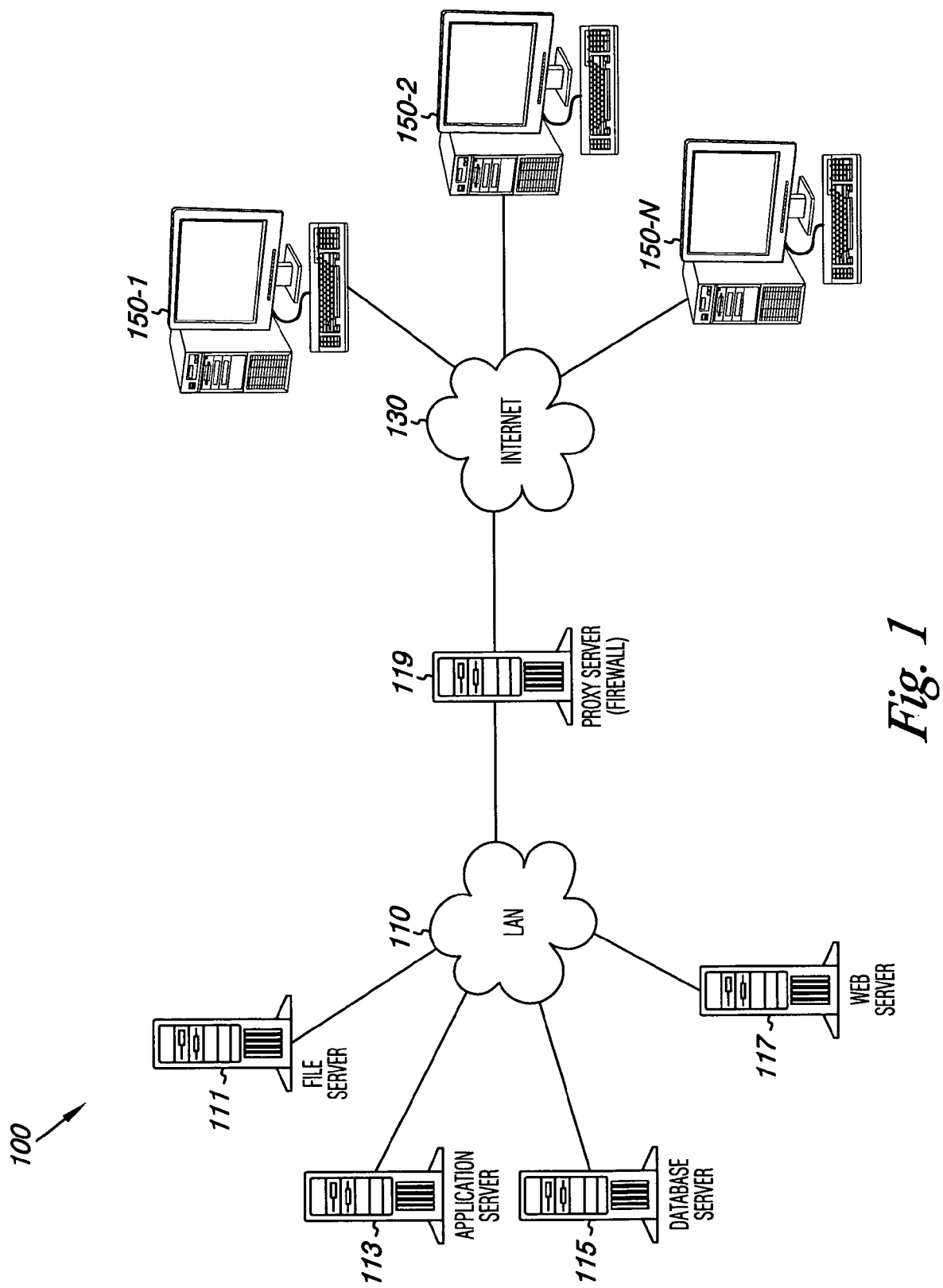
FIG. 1 is an illustration of a system embodiment according to the teachings of the present disclosure.

FIG. 1 is an illustration of a system embodiment according to the teachings of the present disclosure. FIG. 1 illustrates an exemplary computing network 100 suitable for implementing embodiments of the present disclosure. A number of network devices, e.g. personal computers, servers, computing peripherals, etc., can be networked together via a local area network (LAN) 110. Network devices can also be networked together via other kinds of networks. The embodiment of FIG. 1 illustrates a number of servers networked together through the LAN 110.

The servers connected together through the LAN 110 include a file server 111, an application server 113, a database server 115, a web server 117, and a proxy server 119. A LAN can also include various other servers. The file server 111 can store various files, and program instructions on file server 111 can execute to provide access to those files through the LAN 110. The application server 113 can store various program applications with various program instructions, e.g., computer executable instructions, which can be executed over the LAN 110. The database server 115 can store various databases and program instructions on server 115 can execute to provide access to those databases through the LAN 110. For example, the database server 115 can store a database with educational cost and funding information from various sources including, educational institutions, parents, and students, among others as described herein. Program instructions on web server 117 can execute to provide various services associated with the Internet's World Wide Web. For example, program instructions on web server 117 can execute to provide access to one or more web pages on an Internet website which provides education planning information that can be used to determine and compare funding strategies associated with an amount of funds to be borrowed to pay for attending a particular institute of higher education. The information on the website can be displayed in various information and input fields and adjusted to allow a family to customize and evaluate a funding strategy that is suitable to the family's financial tolerance, as described in connection with FIGS. 3-9. The proxy server 119 can connect the LAN 110 to the Internet 130 and can serve as a firewall between them.

A number of computing devices can also connect to the Internet 130. FIG. 1 shows computing devices 150-1, 150-2, . . . , 150-N. The designator "N" is intended to represent that a number of computing devices can be connected to the Internet 130. The computing devices 150-1, 150-2, . . . , 150-N are each connected to the Internet 130. These computing devices can connect to the Internet 130 in various ways, such as through dial-up connections, cable lines, DSL lines, through other networks, etc. These computing devices can access various information, such as information on one or more web pages, via the Internet 130. The computing devices can be located in various locations, e.g., homes, businesses, financial aid offices, etc. As described herein, individuals and/or businesses can use computing devices to access education planning information through a website, e.g., via one or more web pages, to evaluate and compare education funding strategies.

Figure 2:
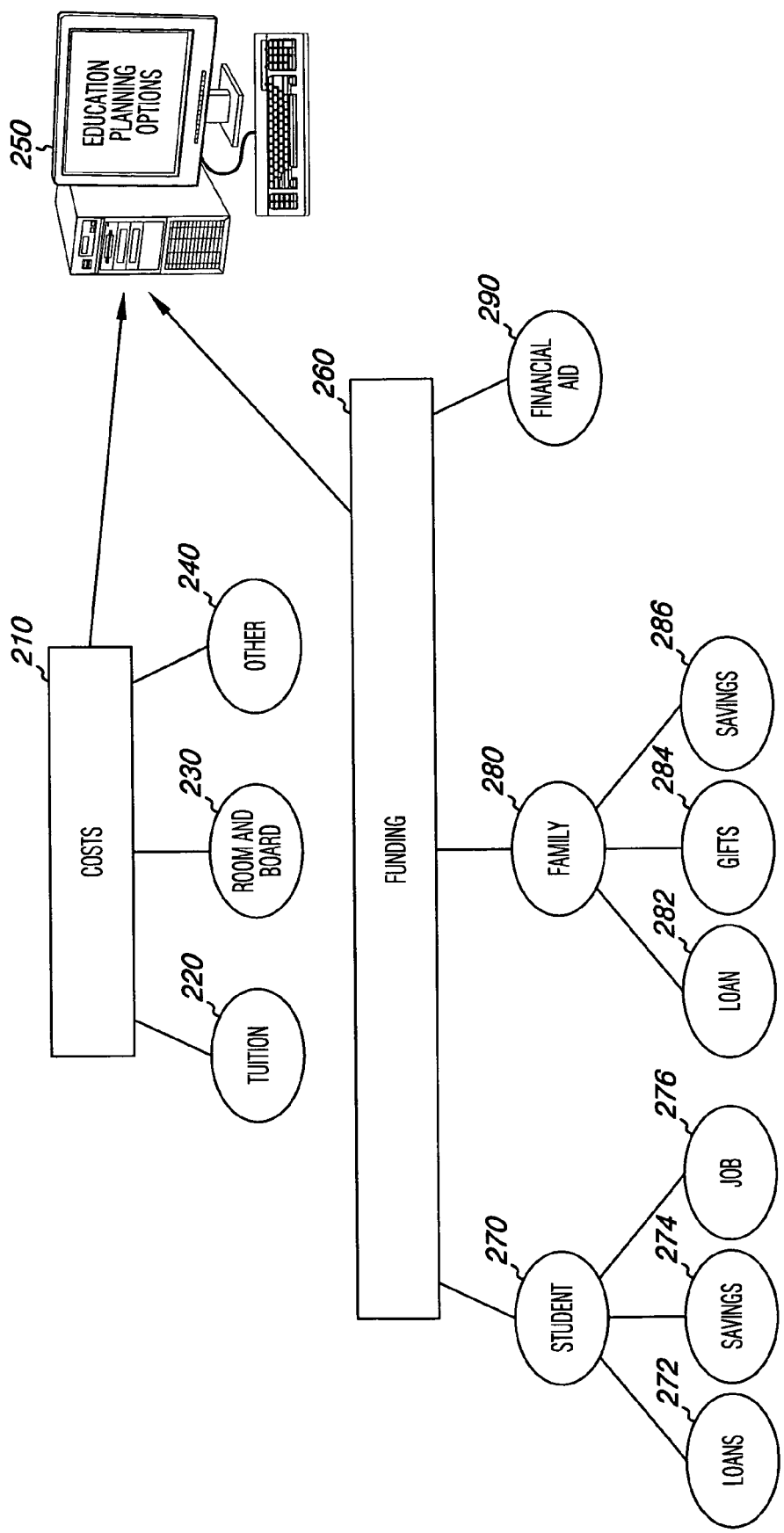
FIG. 2 illustrates a method of education planning according to an embodiment of the present disclosure.

FIG. 2 illustrates a method of education planning according to an embodiment of the present disclosure. In the embodiment of FIG. 2, various information associated with the cost of obtaining an education 210 can be collected. This cost information can include the cost of tuition 220, room and board 230, and other miscellaneous costs 240 (books, fees, etc.) associated with obtaining an education. Program instructions can be executed to provide access to cost information 210 via a computing device 250, e.g., from a server through the internet, etc., as described in FIG. 1. Program instructions can also execute to display the cost information 210 to a viewable interface, e.g., to a display of computing device 250. The information can also be input manually to displayed input fields and can be adjusted by users of computing device 250.

The embodiment of FIG. 2 also shows various information 260 that can be collected that is associated with funding the cost of obtaining an education. Like the cost information 210, the funding information 260 can be provided to a computing device 250, e.g., via a server, and/or entered manually by a user and can be adjusted via input fields provided to a display of computing device 250. The funding information can include actual funds available to pay the cost and/or estimates or assumptions of funds available to pay the cost. For example, the embodiment of FIG. 2 illustrates funding sources including a student 270, a family 280, and financial aid 290. Embodiments of the present disclosure are not limited to these funding sources.

Student funding sources 270 may include funds in the form of student savings 274 that is expected to be contributed to pay the cost of obtaining an education. Student funding sources 270 may also include student loans 272 that may be available to the student. Student loans 272 may include federal loans such as Stafford loans or Perkins loans, which may be subsidized or unsubsidized. Subsidized loans refer to loans that do not accrue interest to the borrower during a grace period, or deferment. Federal loans often have borrowing maximums and may depend on financial need. Student loans 272 may also include commercial loans, e.g., private loans from financial institutions, and or institutional loans from an educational institution. Student funding sources 270 may also include funds to be contributed from a student's job 276, e.g., funds expected from employment while attending school, from a summer job, etc.

Family funding sources 280 can include, but are not limited to, loans 282, gifts 284, and savings 286. Loans available to families, e.g., parents, can include federal loans such as a Parent Loan for Undergraduate Students (PLUS) loan, commercial loans, institutional loans, etc. Gift sources 284 can include gifts from parents, grandparents, and other relatives to be used to pay for the cost of obtaining an education. Family savings sources 286 can include funds from personal savings and savings plans such as 529 savings plans.

Financial aid funding sources 290 can include gift aid that may be contributed by various sources including particular educational institutions, the government, etc. Gift aid can be merit-based or non merit-based aid, e.g. scholarships, grants, etc. Merit-based aid refers to financial aid that is awarded based on merit, e.g., high grades, test scores, etc. Today, many institutes of higher education provide financial aid award summaries to students that include both merit and non merit gift aid to reduce the cost of attending the school and thereby making the cost more manageable for students and their families. The State and Federal governments may also award financial aid in the form of scholarships or need-based grants such as Federal Pell grants.

The embodiment of FIG. 2 illustrates both cost information 210 and funding information 260 being accessible by a computing device 250. According to various embodiments, program instructions can be executed to determine an amount to be financed by using the cost information 210 and funding information 260. Program instructions can also be executed to display a number of education planning options to a viewable interface, e.g., a screen of device 250. As will be discussed in connection with FIGS. 3-9, a user of a device 250, e.g., a student, a parent, a financial aid officer, a financial planner, etc., can adjust the cost and funding information using various input fields and selectable options provided to the viewable interface.

According to embodiments of the present disclosure, program instructions can be executed to determine an amount to be borrowed by a parent and/or family to pay for a particular education. The borrowed amount is based on the various cost information 210 and funding information 260 provided to a computing device, e.g., by being manually entered to an input field of a viewable interface, by being loaded from a data file on a server, etc. As will be discussed in greater detail herein, the amount to be borrowed can be allocated between parties, e.g., a student and parents. For example, parents may decide to borrow enough funds so that the student will not have to repay any loans (federal or institutional) upon graduation. On the other hand, a family may decide to share the cost between the student and parents. For example a family may decide that a suitable payment plan includes an allocation in which the parents borrow 85% of the amount to be borrowed and the student borrows the remaining 15%.

Program instructions also can be executed to provide a comparison of a number of available payment plans to a viewable interface, e.g. a display of device 250. As further discussed in connection with various embodiments herein, program instructions can be executed to provide a payment that includes a levelized payment that is determined by using a net present value of a number of funding events, e.g., more than one loan disbursement. The levelized payment plan includes a levelized payment that is to be made for the repayment term, which begins at or near the time of the first disbursement, and typically ends a number of years after a student graduates, e.g., 10 years, 20 years, etc.

As described in greater detail below, in various embodiments, the levelized payment can be an equal fixed monthly payment such that a balance of the amount to be borrowed to pay for an education, e.g., a multi-year degree program, is zero at the end of the repayment term. In various embodiments, the amount of the levelized payment is established before the first funding event, e.g., before the first loan disbursement.

The comparison of the payment plans can include an amount of a monthly payment, the date on which payments are scheduled to begin, the total amount that will have been paid at the end of a repayment term, etc. The comparison of the payment plans allow users, e.g., students, parents, financial aid officers, financial planners, etc., to evaluate and determine an education planning strategy that is suitable for a particular family's financial tolerance.

According to embodiments, program instructions on a computing device, e.g., computing device 250, can be executed to automatically update the displayed payment plans based on adjustments to the cost information 210, funding information 260, the allocation of the amount to be borrowed, etc. In this manner, the various payment plans can be customized by changing the various options. For example, a family can adjust the borrowing allocation such that the parents' monthly payment is under a certain amount, e.g., $500, $1000, etc. Similarly, a family can adjust the borrowing allocation such that the student's debt, e.g., his/her debt upon graduation, remains below a certain amount, e.g., $10,000, $30,000, etc. In various embodiments, program instructions can be executed to display a recommended maximum monthly payment obligation for a student based on amounts that may be borrowed by the student and an expected monthly income of the student. A family may use this information to adjust the borrowing allocation. For instance, the parents may choose to borrow a portion of the total amount to be financed such that the student's monthly payment is at or below the recommended maximum, for example.

A financial aid officer or financial planner can also adjust various cost information 210, funding information 260 and borrowing allocation to alter the various payment plans to vary the apparent affordability of a particular education, for example. For example, a school financial aid representative or financial planner, who may be discussing education planning strategies with a family, can adjust the school's financial award package and the family could view the updated payment amounts "in real time" based on such adjustments. In this manner, the financial planner or financial aid representative can assist a family with determining a funding plan that may be suitable for financing a student's education at a particular institute of education in a manner which can enhance demonstrating an affordability of the education.

FIGS. 3-9 are viewable interfaces for education planning according to a sequence embodiment of the present disclosure. Although the sequence embodiment example illustrated in FIGS. 3-9 assumes education planning for a four year enrollment by a student at an educational institution, embodiments of the present disclosure are not limited to a given length of enrollment.

Program instructions on a computing device can execute to provide the interface in various embodiments as one or more web pages accessible through the Internet, an Intranet, screens displayed from a stand-alone device, such as a computer, or screens displayed through other electronic media. The viewable interface can include various information fields, input fields, selectable options, etc. Program instructions can execute to allow a user, such as a parent, student, and/or financial planner, to input various information related to education planning, such as cost information, funding information, etc., such as shown in FIG. 2. Program instructions can also execute to allow a user to adjust the various input fields and to change selectable options. Program instructions can also execute to incorporate the adjustments into various education planning calculations and automatically update the various funding plans accordingly.

Figure 3:
FIG. 3 is an example viewable interface for education planning according to a sequence embodiment of the present disclosure.

FIG. 3 is an example viewable interface 300 for education planning according to a sequence embodiment of the present disclosure. The viewable interface 300 shows a header 305, a biographical information section 310, and a preliminary financial information section 315. The header 305 can be customizable to contain the logo 306 of a particular school, business (e.g., loan administrators), financial institution, etc. The biographical information section 310 can include input fields 312 for entering information that can include a parent's name, a student's name, and an email address, for example. According to embodiments of the present disclosure, program instructions can be executed to save the biographical information, print the biographical information and/or to allow a user to send education planning results to a remote location via email, etc.

The preliminary financial information section 315 can contain various information that can be entered via input fields, selected via drop-down menus, etc. For example, the embodiment of FIG. 3 shows section 315 containing a drop-down menu 316 that allows a user to select where a student will be living or is expected to be living while attending a school. For example, drop-down menu 316 can include options for "living with parents," "living off campus," or "living in dormitory." In the embodiment of FIG. 3, a choice of "living in a dormitory" has been selected. Section 315 also shows an input field for a budget increase rate. Each of the fields in section 315 can include drop down menus and embodiments are not limited to the examples shown in FIG. 3. For instance, section 315 can include various other fields that may affect education cost calculations such as a field indicating whether the student is an in-state or out-of-state resident, for example.

Program instructions can execute to incorporate information provided in section 315 in education cost calculations as described herein. For example, the cost of room and board will vary depending on where a student will live, i.e., which option is selected from drop down menu 316. Also, the rate of tuition increase (shown as "Budget Increase Rate") affects the yearly tuition cost. According to various embodiments, program instructions can execute to use the budget rate increase, e.g., 3%, 4%, 8%, etc., to estimate the future yearly cost of a particular education based financial forecasts, historical data, etc. For example, the budget rate increase shown in section 315 (6%) is used to estimate the future cost increase of education as illustrated in the viewable interface 500 of FIG. 5. That is, in the embodiment of FIG. 5 (discussed below), interface 500 reflects the per year cost of a particular education for each of four years that includes the 6% increase.

FIG. 4 is another example viewable interface 400 for education planning according to a sequence embodiment of the present disclosure. The viewable interface 400 includes a subheader 420 for a funding information section 430 that contains various input fields for entering financial resources, e.g., cash contributions, or expected financial resources from a student and/or a student's family to pay for educational expenses. Family cash contribution sources can include, but are not limited to the examples in section 430 including, "student savings," "student summer job," "non-parent gifts," "parent college savings," etc. The embodiment of FIG. 4 illustrates selectable options, e.g., option 440 of the "student savings" portion of section 430. In this embodiment, a user can select to have the various cash contributions allocated "evenly" or "as needed." If a user selects to have a contribution allocated "evenly," then program instructions execute to allocate the contributed amount evenly over the expected number of years of enrollment, e.g., four years (as shown), five years, etc. If a user selects to have a cash contribution allocated "as needed," then program instructions execute to allocate the contributed amount to the first year that contains a funding shortfall as discussed below.

The interface shown in FIG. 4 also displays the total amount of family financial resources 450 (shown as "Total Family Resources") from section 430 and in which year the contributions are to be used. For example, as shown in the embodiment illustrated in FIG. 4, the student is expected to contribute $5,000 in year 1 from a student savings and $2,500 each year for four years from a summer job. As shown in viewable interface 400 example of FIG. 4, the parents plan to evenly contribute funds in the total amount of $20,000 from college savings (shown as "Parent College Saving Amount"). As shown, the $20,000 is dispersed evenly, i.e., the selectable option "evenly" is selected such that the funds are allocated $5,000 each year for four years. Similarly, interface 400 reflects that $3^{rd}$ party, e.g., relative (shown as "Non Parent Relatives") contributions in the amount of $15,000 are to be allocated evenly, i.e., $3,750 each year for four years as shown. Therefore, the total sum of family resources 450 illustrated in viewable interface 400 is $50,000. FIG. 4 also illustrates a column break out total of the family resources across the expected number of years of enrollment.

FIG. 5 is another example viewable interface 500 for education planning according to a sequence embodiment of the present disclosure. Viewable interface 500 includes a subheader 520, e.g., "cost of education and financial aid summary," above a number of associated input fields, e.g., section 530. Section 530 includes input fields for the cost of attending an institution 532 (shown as "Cost of Education"), e.g., tuition, room and board, etc., e.g., factors taken into consideration in block 210 of FIG. 2. For example, section 530 of the viewable interface 500 shows the cost of education to be $34,500 in year 1, $36,570 in year 2, $38,764 in year 3, and $41,090 in year 4, for a total cost of education 533 of $150,924.

Section 530 also includes input fields for financial aid information such as gift aid (grants, scholarships, etc.), subsidized and unsubsidized Stafford loans, Perkins loans, institutional loans, work study, etc. As the reader will appreciate, the information in section 530 can come in the form of a financial aid summary from a particular educational institution. In section 530 of interface 500, a gift aid (shown as "Scholarship") of $7,500 is shown for each of four years for a total of $30,000. As mentioned above, gift aid can include both merit-based and non merit-based aid from a particular educational institution, from the government, etc. Section 530 also shows a Stafford Loan (shown as "FFEL Unsubsidized Stafford Loan") for each of four years. Section 530 also shows a funding amount from "work study" in the amount of $1,200 for each of four years. Work study refers to student employment offered by many institutions as part of a financial aid package. Section 530 also includes the amount of family contributions 534 (shown as "Total Family Contribution") allocated to each of the four years, and the total family contribution ($50,000) carried over from funding information section 430 of FIG. 4.

Program instructions can be executed to determine an estimate of the "annual costs not funded" 536 based on deducting the various available funding sources, e.g., gift aid, family cash contributions 534, federal student loans, etc., from the estimated yearly cost of attending a particular institution 532. The embodiment illustrated in FIG. 5 indicates a total cost not funded 537 of $48,999.

As will be discussed below, in various embodiments, the total cost not funded 537 may represent the total amount to be borrowed by a parent of a student planning to obtain a multi-year education. As described below, in various embodiments, the amount to be borrowed by a parent may also be more or less than the total costs not funded 537. For example, the total cost not funded 537 may increase if the student is not eligible for student loans, or if a family decides that a student should not acquire debt by obtaining student loans. For instance, in the example shown in interface 500 of FIG. 5, the total cost not funded would be increased by the amount of $17,125 (the total amount of the unsubsidized Stafford loans) if the loans were not available to the student, for example. On the other hand, the total cost not funded would decrease if the student obtained additional loans, e.g., federal loans, commercial loans, institutional loans, etc. As will be discussed in connection with FIG. 7, program instructions can be executed to allow the total cost not funded 537 to be allocated among parties, e.g., among a parent and student. That is, a family can evaluate various funding plans and may decide to allocate a certain portion of the total cost not funded 537 to the student, for example.

FIGS. 6A and 6B are example viewable interfaces for education planning according to a sequence embodiment of the present disclosure. Viewable interfaces 600 and 601 of FIGS. 6A and 6B, respectively, can be used to assist a family in determining a suitable education planning strategy. As will be discussed below, viewable interfaces 600 and 601 include information to assist with determining how much a student can afford to borrow. That is, the information can be used by a family as a factor in determining an appropriate borrowing allocation. The information can include a student's expected major or career, debt at graduation, monthly loan payment, debt to income ratio, etc. For example, section 630-1 includes a drop-down menu 632 that allows a user to select a field of study, e.g., English, History, Economics, etc. Program instructions can be executed to display an estimated starting salary upon graduation for a student with the selected major. For example, input field 635 displays a starting salary ($38,254) associated with the currently selected major, i.e., Business Administration.

Viewable interface 601 of FIG. 6B illustrates information associated with a selected major (shown as "Economics/Finance") in section 630-2. Section 630-2 also includes an "average starting salary" ($40,630) associated with the selected major at field 637. Program instructions can be executed to automatically change the estimated starting salary based on the selected major. In the example illustrated in interface 601, the student's "monthly loan payment" is shown as $339 and the student's "total debt at graduation" is shown as $30,445. These values can be based on a maximum recommended debt to income ratio. For example, the monthly payment and total debt values illustrated in section 630-2 are based on a debt to income ratio of 10% as shown. The information from section 630-2 can be considered by parents in determining how to allocate the borrowing amount, e.g., the amount not funded 537 as shown in FIG. 5. For example, parents may choose to allocate a large enough portion of the amount not funded 537 to themselves such that the student's expected debt to income ratio is at or below 10%. That is, a family may decide that the parents will allocate a portion of the amount not funded 537 such that the student's monthly debt, e.g., the student's monthly loan payment, is 10% or less of the student's monthly gross income, for example.

Figure 7:
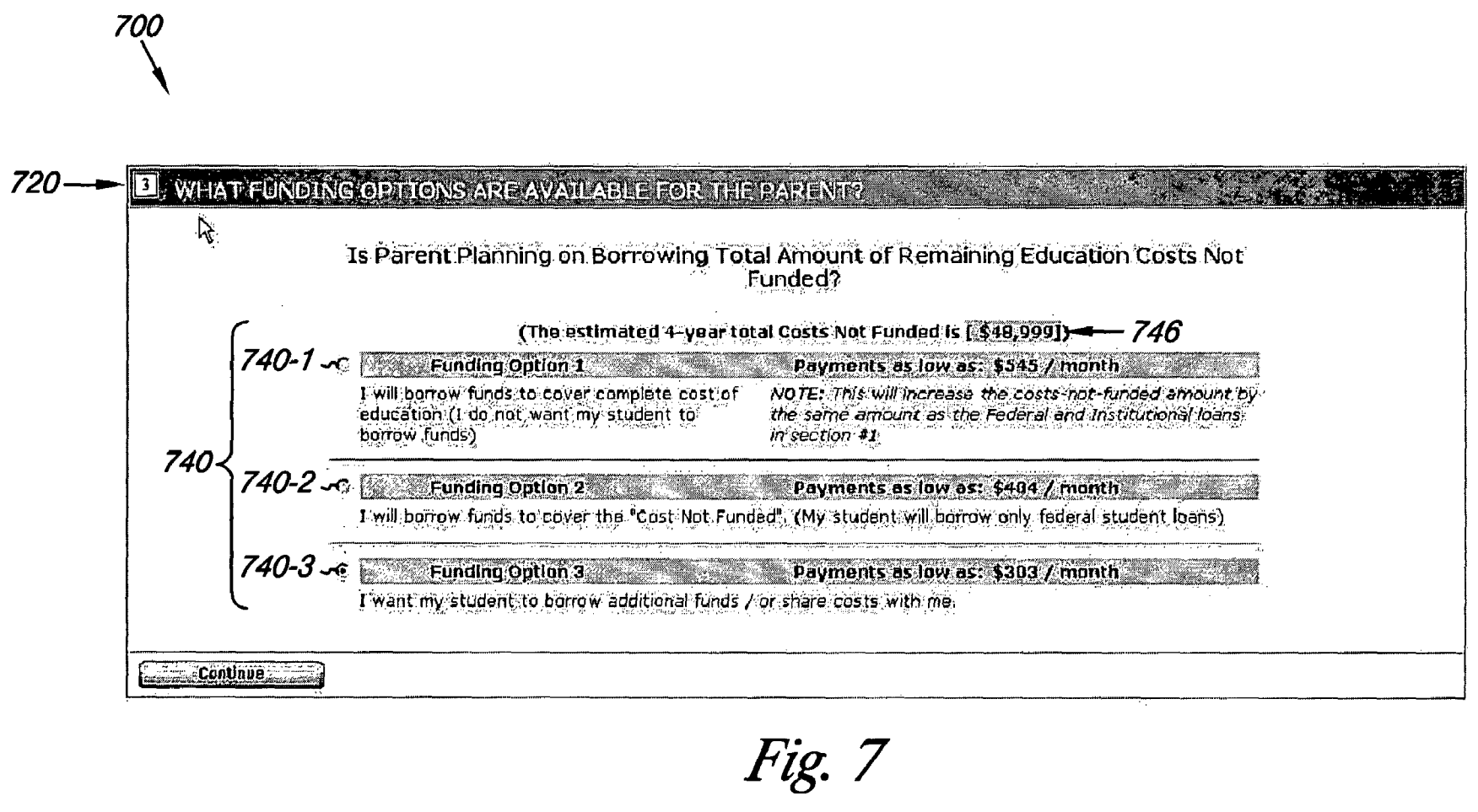

FIG. 7 is another example viewable interface 700 for education planning according to a sequence embodiment of the present disclosure. Viewable interface 700 includes a subheader 720 (shown as "What funding options are available for the parents?") for a borrowing allocation option section 740. Section 740 of viewable interface 700 shows three selectable options (741-1, 741-2, and 741-3) for allocating the total borrowing amount, or total costs not funded 746, e.g., the total cost not funded 537 ($48,999) shown in FIG. 5. Embodiments are not limited to the funding options illustrated in FIG. 7. Funding option 741-1 can be selected if a party, e.g., a parent or parents, chooses to evaluate a funding option in which they fund the entire education cost such that a student borrows no funds to pay for the particular education. It is noted that the entire education cost associated with funding option 741-1 includes the borrowing amount 746 plus any other loans that the student may have been eligible for, e.g., Stafford loans, Perkins loans, commercial loans, institutional loans, etc. For example, in the embodiment of the present disclosure as described in FIGS. 3-9, the entire education cost of the particular education could be the borrowing amount 746 ($48,999) plus the $17,125 in Stafford loans from section 530 of viewable interface 500 in FIG. 5 (a total of $66,124).

Funding option 741-2 can be selected by a parent or parents if they choose to evaluate a funding option in which they fund the total borrowing amount 746, i.e., the student is responsible for borrowing only federal loans, e.g., the $17,125 in Stafford loans shown in section 530 of viewable interface 500. Funding option 741-3 can be selected if a family chooses to evaluate funding options in which the student is to borrow funds in addition to the student loans in section 530 of FIG. 5, e.g., private loans in addition to federal loans, to share the cost 746. As discussed in connection with FIG. 9, selectable funding option 741-3 allows a user to allocate the cost 746 between parties, e.g., between parents and a student.

Figure 8A:
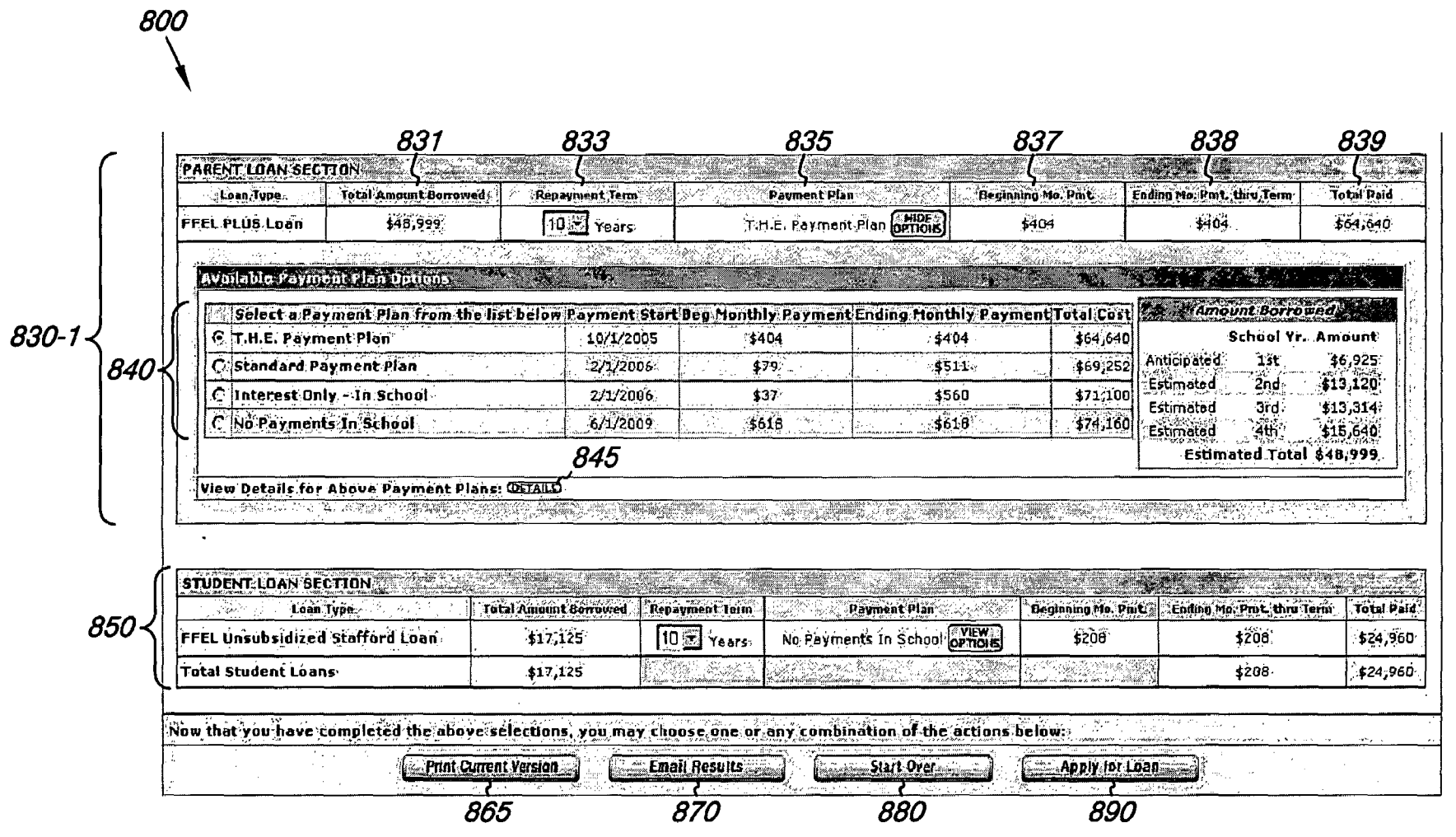
Figure 8B:
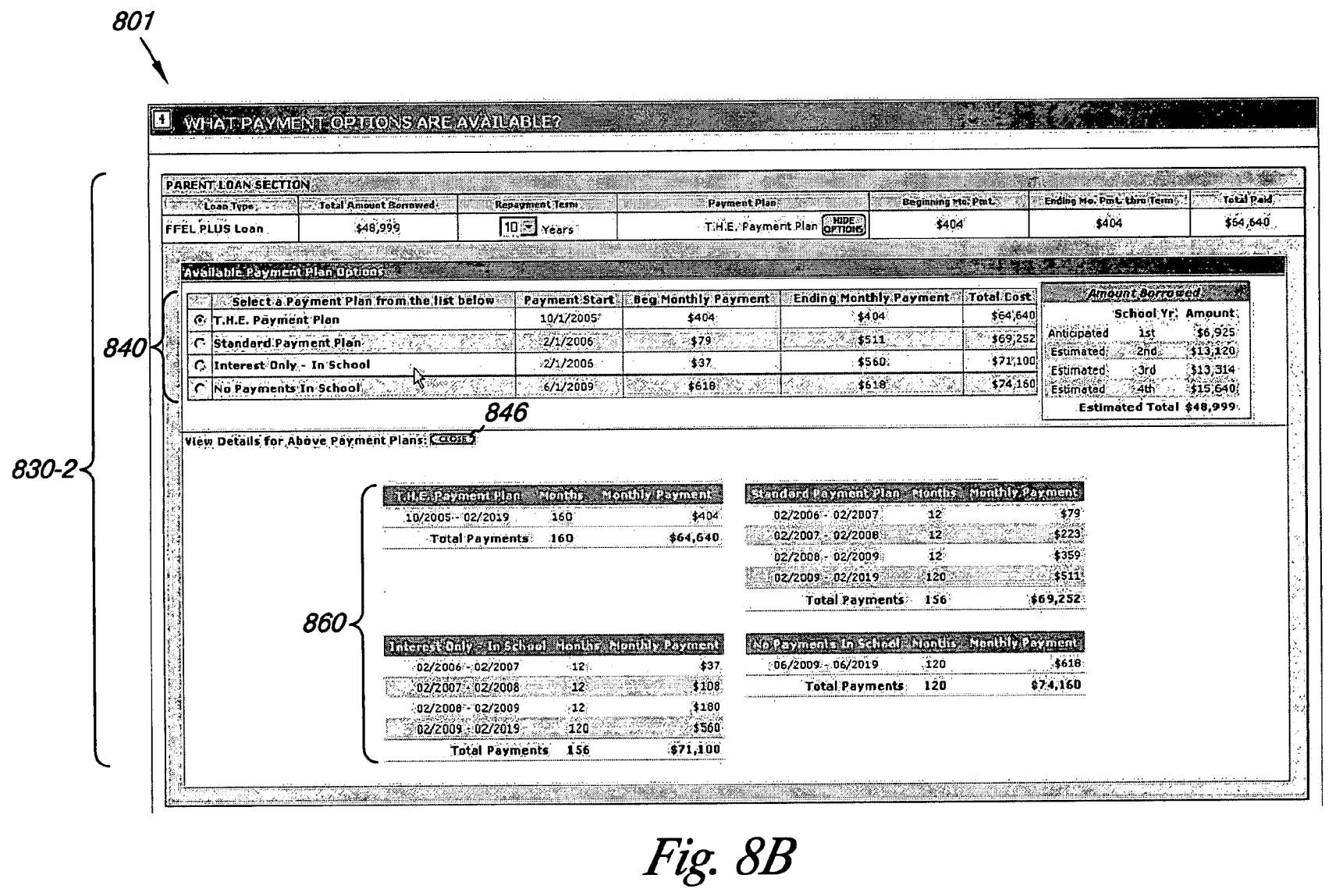

FIGS. 8A and 8B are example viewable interfaces for education planning according to a sequence embodiment of the present disclosure. In the sequence embodiment illustrated in viewable interfaces 800 and 801, it is assumed that a user has selected funding option 740-2, i.e., the user has selected to evaluate funding options in which a party, e.g., a parent or parents, is to borrow an amount equal to the total costs not funded 746 ($48,999). Viewable interface 800 includes a parent loan section 830-1 and a student loan section 850 for evaluating and comparing various payment plan options.

Parent loan section 830-1 contains various information fields, e.g., a "payment plan" field 835, a beginning monthly payment field 837, an ending monthly payment field 838, and a "total paid" field 839, and selectable input fields, e.g., a "total amount borrowed" field 831 and a "repayment term" field 833. Parent loan section 830-1 also includes a payment plan section 840 that includes a number of selectable payment plan options, e.g., a levelized payment plan (shown as "T.H.E. Payment Plan"), a "standard payment plan", an "interest only-in school" payment plan, and a "no payments in school" payment plan; however, embodiments of the present disclosure are not limited to the payment plan options shown in section 840. Section 840 includes information for evaluating and/or comparing the various payment plans including the date on which repayment is to begin (shown as "Payment Start"), the amount of the initial payment (shown as "Beg Monthly Payment"), the amount of the final payment (shown as "Ending Monthly Payment"), and the "total cost", i.e., the total amount (principal and interest) that will be paid assuming all payments are made.

In the present disclosure, T.H.E. payment plan represents a payment plan that includes a levelized payment to be made at a number of intervals and that is determined by using a net present value associated with more than one funding event. As discussed in detail in connection with FIGS. 12A-12C, the levelized payment associated with a levelized payment plan is determined by operating on variables that include the net present value of a number of funding events, an interest rate, and a repayment term. T.H.E. payment plan may be referred to by names such as The Family Budget Plan, among other names.

As used herein, a net present value refers to a sum of the present values of more than one funding events, e.g., loan disbursements. As discussed below, a present value of a funding event is determined by operating on variables that include the amount of the funding event, an interest rate associated with the funding event, and a length of time from a first funding event to the current funding event. As used herein, a levelized payment plan refers to a payment plan in which scheduled repayment, e.g., monthly payments, of a levelized payment is to begin while a student is enrolled at a school. In various embodiments, the levelized payment is a fixed equal monthly payment such that the balance of the amount to be borrowed is zero at the end of the repayment term. Also, in various embodiments, the amount of the fixed equal monthly payment is established before the first funding event.

According to embodiments of the present disclosure, program instructions can execute to display information associated with a selectable payment plan selected in section 840 at fields 835, 837, 838, and 839. For example, interface 800 shows "T.H.E. Payment Plan" at field 835 since "T.H.E. Payment Plan" option is selected in section 740 of viewable interface 700 shown in FIG. 7. Interface 800 also shows the amount of a levelized payment under T.H.E. payment plan, i.e., the beginning payment 837 and ending payment 838 are the same amount ($404 as shown).

Section 840 of viewable interface 800 also includes examples of selectable non-levelized payment plans, e.g., a standard payment plan, an interest only in school payment plan, and a no payments in school plan. In this example, it is assumed that a student has enrolled in the year 2005 and will graduate in 2009; however, embodiments of the present disclosure are not limited this example. In the sequence embodiment of FIG. 8A, the standard payment plan includes a repayment term that begins while a student is enrolled in school and which includes increased scheduled payment amounts as principal accrues. The interest only in school plan includes making scheduled payments on the interest while the student is enrolled and then an increased payment determined based on an amortization of the principal over the repayment term, e.g., 10 years, 20 years, 30 years, etc. The no payments in school plan includes making no payments of principal or interest while a student is enrolled, and then making a fixed payment based on an amortization of the principal and interest over the repayment term.

The viewable interface 800 also includes a student loan section 850. In the sequence embodiment of FIG. 8A, section 850 includes various information fields and selectable input fields. Program instructions can be executed to display the type and amount of the various loans a student is to borrow based on information provided to input fields of other viewable interfaces, e.g., interface 500 of FIG. 5. For example, section 850 lists the Stafford loan in the amount of $17,125 carried over from section 530 of interface 500. It is noted that section 850 does not include Perkins loans or institutional loans since the amounts of these loans are shown as being in the amount of $0 as shown in section 530 of interface 500 shown in FIG. 5.

Section 850 also displays a payment plan (shown as "No Payments In School"), a "repayment term" (10 years) a beginning monthly payment ($208), an ending monthly payment $208), and a total amount ($24,960) that will have been be paid (shown as "Total Paid") at the end of the repayment term.

The information displayed to the fields of interface 800 can aid a family in evaluating various payment plan options. For example, a family can compare the estimated monthly payments for the both the parents and the student on the same viewable interface, e.g., 800. As mentioned above, program instructions can be executed to automatically update the information displayed on various viewable interfaces, e.g., 800, based on changes or adjustments to input fields and/or selectable options on various viewable interfaces, e.g., 400, 500, 700, etc. For example, a user can adjust information in section 530 of interface 500. These adjustments may include changes to the cost of education 532 based on the cost associated with attending a different school, changes to the amount of financial aid (scholarships, grants, etc.) offered by a particular school, changes to the type and/or amount of federal loans, etc.

As the reader will appreciate, program instructions can be executed to automatically update information fields, e.g., total cost not funded 537, based on adjustments to the input fields in section 530. Program instructions also can be executed to update other interfaces, e.g., 700, 800, etc. For example, instructions can be executed to display the updated cost 537 at field 746 of interface 700 and at the "total amount borrowed" field 831 of interface 800. Also, program instructions can be executed to automatically update the information fields associated with the various payment plans in section 840 based on changes to the amount borrowed 831. That is, instructions can be executed to re-determine the monthly payments for the payment plans and display the updated values based on adjustments to the amount borrowed 831, repayment term 833, etc.

Viewable interface 800 also includes a number of selectable options, e.g., 865 (shown as "Print Current Version"), 870 (shown as "Email Results"), 880 (shown as "Start Over"), and 890 (shown as "Apply for Loan"). If a user selects option 860, program instructions can execute to print one or more of the viewable interfaces. If a user selects option 870, program instructions can execute to email one or more viewable interfaces to an email address, e.g., to the email address provided in section 310 of interface 300. The printing option 865 and email option 870 can allow a user to obtain information associated with various payment plans for later viewing. If a user selects option 880, program instructions can execute to display a different viewable interface. For example, instructions can execute to display interface 300 or other interface of the example sequence embodiment. If a user selects option 890, program instructions on a computing device 150-1, 150-2, . . . , 150-3 can execute to load website, e.g., from a web server 117, to a display of the device. The website can include information for obtaining a loan, e.g., a Federal Family Education Loan (FFEL) PLUS loan, a Stafford loan, an institutional loan, etc.

The parent loan section 830-1 of viewable interface 800 also includes a selectable "details" button 845. When button 845 is selected by a user, program instructions execute to display viewable interface 801 of FIG. 8B. Viewable interface 801 includes a parent loan section 830-2 that includes information displayed in section 830-1 along with a payment plan comparison section 860. Section 830-2 also includes a selectable "close" button 846. Program instructions can be executed to display viewable interface 800 when a user selects button 846, i.e., the user is no longer able to view the details of the payment plans in section 860. Payment plan comparison section 860 includes details of the number of selectable payment plans listed in section 840. The details of section 860 can include information about the various payment plans including the number and amounts of scheduled payments to be made, the total amount that will be paid at the end of the repayment term, a schedule of when scheduled payment amounts are adjusted, etc.

FIG. 9 is another example viewable interface for education planning according to a sequence embodiment of the present disclosure. In the sequence embodiment illustrated in viewable interface 900 it is assumed that a user has selected funding option 740-2, i.e., the user has selected to evaluate funding options in which borrowing funds to finance the total costs not funded 746 ($48,999) can be allocated among parties, e.g., among parents and a student. Viewable interface 900 includes a parent loan section 930 for evaluating and comparing various payment plan options. Section 930 includes an available payment plan section 940 that includes a number of selectable payment plan options and a payment plan comparison section 960 that includes detailed information associated with each of the available plans included in section 940.

Section 930 includes information fields 935 (shown as "Payment Plan"), 937 (shown as "Beginning Mo. Pmt."), 938 (shown as "Ending Mo. Pmt. Thru Term"), and 939 (shown as "Total Paid") that contain information associated with a selected payment plan. In this example, a "Standard Payment Plan" plan is selected in section 740 such that information associated with the standard payment plan appears in information fields 935, 937, 938, and 939. For example, "Standard Payment Plan" appears at 935, along with that plan's corresponding beginning monthly payment 937 ($64), ending monthly payment 938 ($414), and total amount paid during repayment 939 ($56,112).

Section 930 also includes a field 933 (shown as "Repayment Term") which includes a selectable drop down menu that allows a user to choose a repayment term length, e.g., 10 years, 20 years, 30 years, etc. (shown here as 10 years).

As illustrated in interface 900, section 930 also includes a total amount to be borrowed by a party field 931 (shown as "Total Amount Borrowed") which includes a selectable drop down menu 932 for allocating the total cost not funded 746 ($48,999) among parties, e.g., among parents and a student. As shown in the example, a user can use selectable drop down menu 932 to select a certain amount (or percentage) of the total cost to borrow. In the example shown here, the total amount to be borrowed by the parents is selected to be $39, 689, or 81% of the total cost not funded ($48,999). As previously mentioned, program instructions can be executed to automatically update the information in section 930 based on adjustments to input fields, e.g., 931. In this manner, a family can be allowed to evaluate the various payment plans based on a selectable borrowing allocation. For example, a family can evaluate the various payment plans in section 930, e.g., T.H.E. payment plan, the standard payment plan, the interest only in school plan, and the no payments while in school plan, based on the allocation shown, i.e., 81% to the parents. A family then may decide to evaluate and compare the payments plans based on a number of other allocation values, e.g., 90% to the parents, 70% to the parents, 30% to the parents, etc., in order to determine an allocation suitable to a family's financial tolerance.

Figure 10:
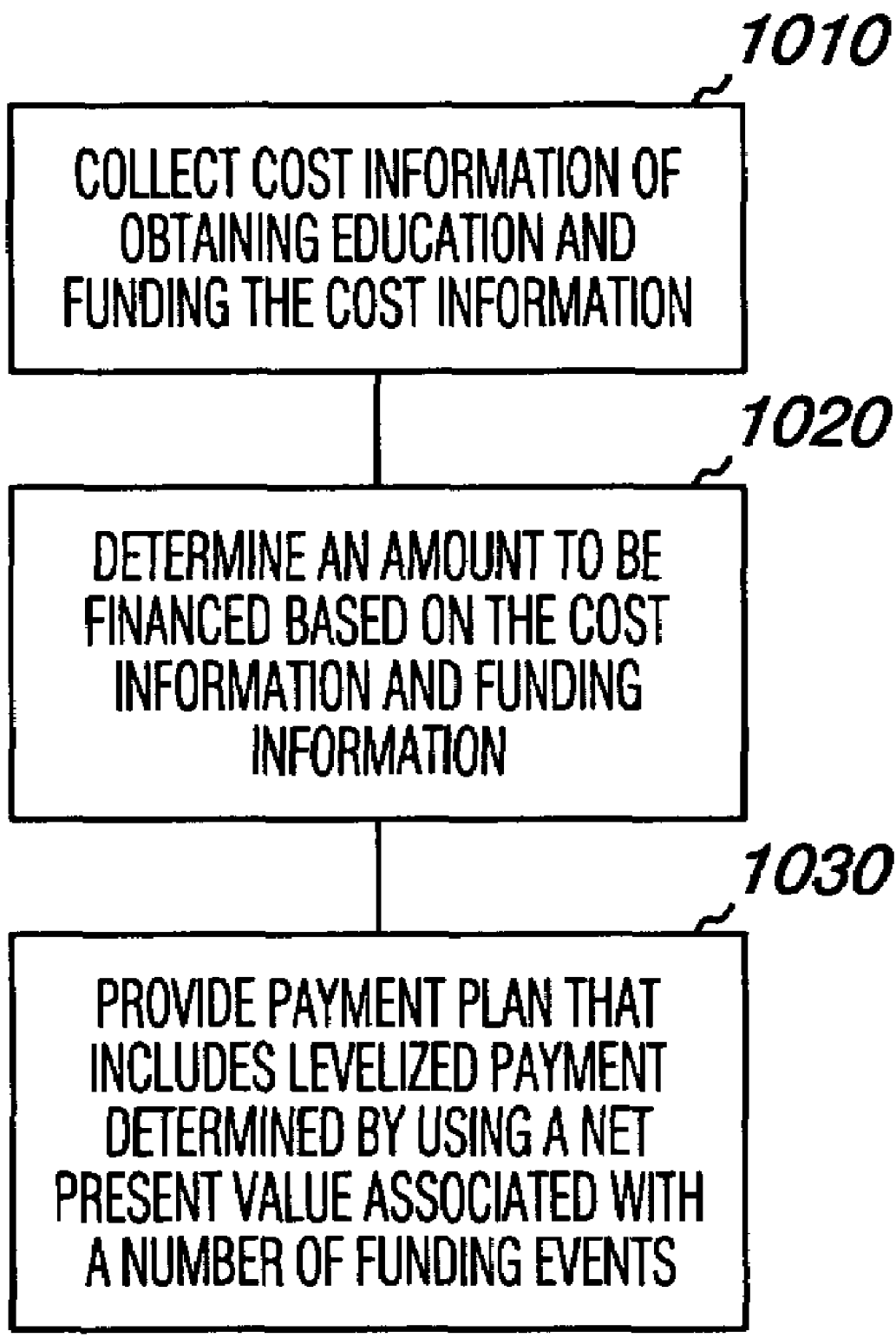
FIG. 10 is a block diagram illustrating a method of education planning according to the present disclosure.

FIG. 10 is a block diagram illustrating a method of education planning according to the present disclosure. At 1010, information associated with the cost of obtaining an education and information associated with funding the cost is collected as discussed above in connection with FIGS. 2-9. The information associated with the cost of obtaining an education can include information associated with the cost of attending a particular institution, e.g., a particular college, university, graduate school, etc. For example, this information may include the cost of tuition, room and board, books, miscellaneous fees, etc. The cost information may be the actual cost of attending a particular school or an estimated cost. For example, the cost information may be estimated based on a rate of budget increase expected, e.g., many school tuition rates can increase by 5% or more each year.

As shown at block 1020, the method of FIG. 10 includes determining an amount to be financed based on the cost information and the funding information. As discussed in connection with the sequence embodiment of FIGS. 3-9, program instructions can execute to determine the amount to be financed based on information provided to various viewable interfaces, e.g., 300, 400, 500, 600, etc. A user of a computing device, e.g., 150-1, 150-2, 150-N, can select various options, e.g., 741-1, 741-2, and 741-3 for allocating the amount to be financed among parties, e.g., among a student and a parent or parents. For example, a family can decide to have the student borrow only funds available through federal student loans, e.g., Stafford loans and Perkins loans. A family can also decide that the student should not borrow any funds to pay for the particular education, i.e., the student should not obtain federal student loans even if they are available. A family can also decide to have the student share costs with them by having the student obtain private loans sufficient to cover a selectable portion of the educational costs, e.g., 10%, 30%, 80%, etc.

As shown at block 1030, the method embodiment of FIG. 10 includes providing a payment plan that includes a levelized payment determined by using a net present value associated with a number of funding events, e.g., more than one loan disbursement. The repayment term of the levelized payment plan can begin during a student's enrollment at a school, e.g., at or near a time that a first funding event occurs, i.e., when a first loan disbursement is made. The amount of the scheduled payments is levelized, i.e., the levelized payment amount does not change when funding events occur. The levelized payment plan can be a viable alternate funding strategy for families evaluating their financial tolerance and ability to pay for a student's higher education. By allowing a party to make payments on a funding event, e.g., a loan disbursement, that is to occur in the future, a levelized payment plan can be a suitable plan for families.

Figure 11:
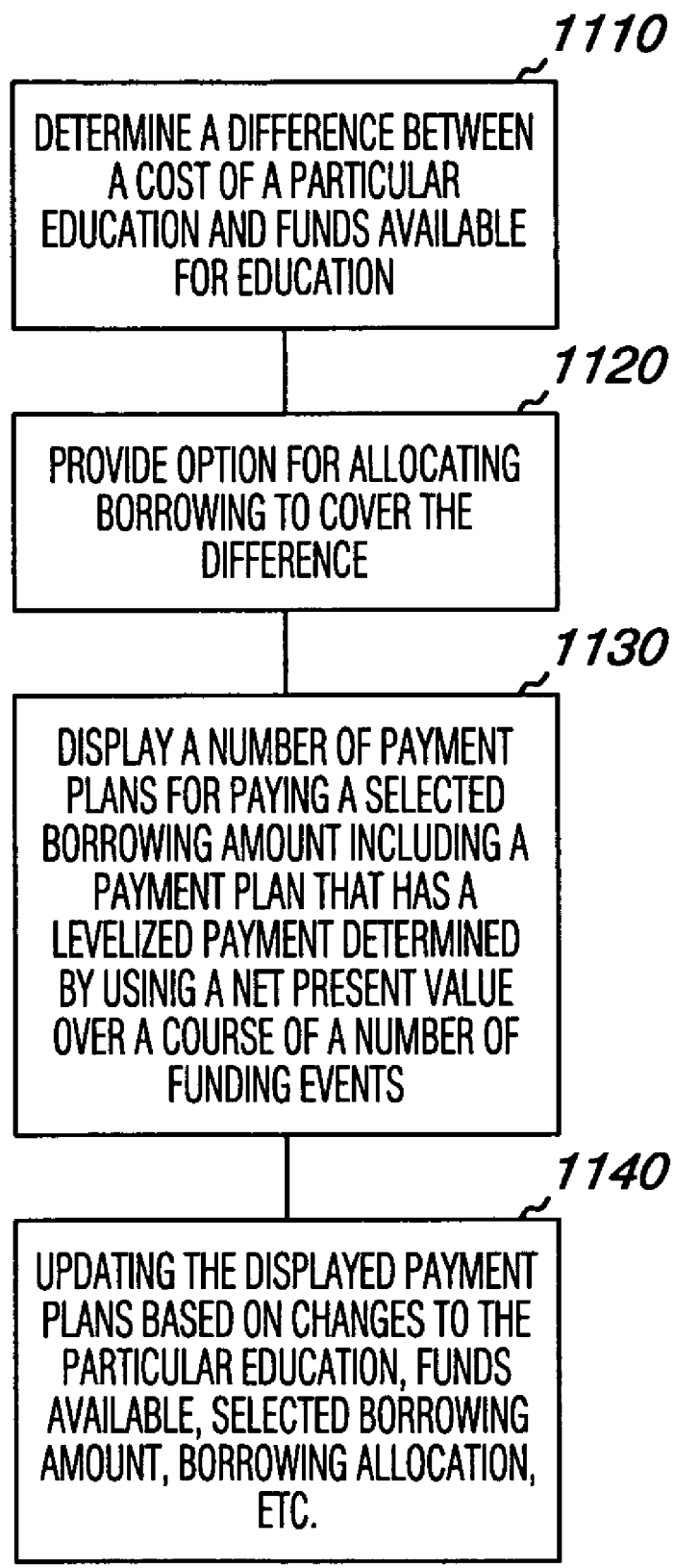
FIG. 11 is a block diagram illustrating another method of education planning according to an embodiment of the present disclosure.

FIG. 11 is a block diagram illustrating another method of education planning according to an embodiment of the present disclosure. At block 1110 program instructions can execute to determine the difference between the cost of a particular education and funds available for the education. As discussed above, the costs can include tuition, room and board, books, etc. The available funds can include federal student loans, gifts, grants, scholarships, etc. from various sources including the student, the family, the educational institution, etc. as discussed in connection with FIGS. 2-9.

At block 1120, the method embodiment of FIG. 11 includes providing an option for allocating borrowing among parties, e.g., a student and a parent, to cover the difference as described above and in connection with FIG. 7.

At block 1130, the method embodiment of FIG. 11 includes displaying a number of payment plans for paying a selected borrowing amount including a payment plan that has a levelized payment that is determined by using a net present value over a course of a number of funding events. The payment plans can be displayed on a viewable interface, e.g., viewable interfaces 800 and 801. Program instructions can execute to display the viewable interfaces on a website that is accessible by a computing device, e.g., 150-1, 150-2, 150-N, via Internet 130.

At block 1140, the method embodiment of FIG. 11 includes updating the displayed payment plans based on changes to the education costs, funds available, selected borrowing amount, selected borrowing allocation, etc. For example, the scheduled payment amounts for the various payment plans, e.g., the plans shown on viewable interfaces 800 and 900, depend on numerous factors that can be adjusted and/or changed by a user, e.g., a parent, a student, a school financial aid representative, a financial planner, etc. According to embodiments of the present disclosure, program instructions can execute to update the viewable interfaces based on the various changes and/or adjustments. For example, according to embodiments of the present disclosure, program instructions can execute to load financial aid award summaries of particular schools to a computing device from a server, e.g., a file server 111, a database server 115, etc. As the reader will appreciate, various fields associated with the viewable interfaces, e.g., 400, 500, 700, etc., will change based on the particular school's tuition costs, gift aid, student loans, etc. Program instructions can be executed to update the appropriate fields, e.g., the cost to be borrowed by a parent and or student, and display updated payment plans based on the updated changes. A user can then choose to reallocate the borrowing amounts between the parties based on the updated payment plans. That is, a user can change the allocation via an appropriate interface, e.g., interface 900.

FIGS. 12A-12C illustrate formulas for determining the amount of a levelized payment according to an embodiment the present disclosure. A levelized payment can be obtained by determining the net present value of an amount of funds that is to be disbursed at a later time. For example, typically loans to fund an education are disbursed at the beginning of a semester of study, e.g., in September for a Fall semester and in January for a Spring semester.

FIG. 12A illustrates a formula 1210 for determining the present value ($P_z$) associated with the amount (a) of a loan disbursement. The subscript "z" is used to represent the current funding event, e.g., $P_1$ for a first funding event, $P_2$ for a second funding event, etc. The present value ($P_z$) of a loan disbursement can be determined using the formula 1210:

$$P_z = \frac{a}{(i+1)^D}$$

where i is a daily interest rate associated with the disbursement and D is the number of days from a first disbursement to a current disbursement. For example, the present value ($P_z$) of a first disbursement ($P_1$), e.g., a $10,000 disbursement to be made during the Fall of a first year of enrollment, is equal to the amount of the disbursement, i.e., the number of days from a first disbursement to the current disbursement is zero because the current disbursement is the first disbursement. On the other hand, future expected disbursements will have present values ($P_z$) less than the actual amount (a) of the disbursements, and will depend on the daily interest rate, i, and the number of days from the first disbursement, D. For example, the present value ($P_z$) of a $10,000 disbursement to be made in the Fall of a second year of enrollment (about 365 days after the first disbursement) will have a present value ($P_3$) of about $9,418, assuming an annual interest rate of about 6%, which would correspond to a daily interest rate (i) of about 0.000164 (6%/365). Also, the present value ($P_8$) of a $10,000 disbursement to be made in the Spring of a fourth year of enrollment (about 1218 days after a first disbursement) will have a present value of about $8,186, assuming the same daily interest rate (i).

By summing the present values ($P_z$) for the number of loan disbursements to be made, a net present value (V) of the total disbursement amount can be determined. For example, if one assumes that a total of eight $10,000 disbursements are to be made, e.g., each semester for four years, then the net present value (V) is about $72,549, assuming the same daily interest rate (i) in the above examples. This net present value (V) represents the market value of the total amount to be disbursed ($80,000) at or near the time that the first disbursement is to be made. In the above example it is also assumed that disbursements are made in September and January. It is noted that embodiments of the present disclosure are not limited to two disbursements per year. Also, the disbursements in the above example are in equal amounts of $10,000 for ease of illustration; however, embodiments of the present disclosure are not limited to equal disbursement amounts or to a specific disbursement amounts. The net present value (V) can be used to determine a levelized payment (L) associated with a levelized payment plan, as discussed below.

FIG. 12B illustrates a formula 1220 that can be used to determine the amount of a levelized payment (L) associated with a levelized payment plan, e.g., T.H.E. Payment Plan, according to embodiments of the present disclosure. That is, program instructions can be executed to operate on the variables of formula 1220 to determine a levelized payment (L). According to one embodiment of the present disclosure, the levelized payment (L) is can be determined using the formula 1220:

$$L = \frac{-V * I * (I+1)^T}{1 - (I+1)^T}$$

where V is a net present value of a number of funding events (e.g., loan disbursements), I is an interest rate (e.g., a monthly interest rate), and T is a period of time from the time of a first funding event to the end of a repayment term. For example, if a first loan disbursement is made in September of year 1, a final loan disbursement is made in January of year 5 and the repayment term ends ten years after the final loan disbursement (a typical scenario assuming a four-year college), then T can be expected to be about 160 months (about 40 months between the first and last loan disbursements plus the 120 months assuming a ten year repayment term).

The levelized payment determined by using formula 1220 can represent a monthly payment amount to be made as a part of a levelized payment plan, e.g., T.H.E. Payment Plan, according to embodiments of the present disclosure. For example, the viewable interfaces 800 and 801 of the sequence embodiment illustrated in FIGS. 8A and 8B, respectively, include a payment plan comparison section 840 that includes "T.H.E. Payment Plan." It is noted that T.H.E. Payment Plan in section 840 is shown as being "selected" such that information associated with the plan is shown at fields 835, 837, 838, and 839. Also, the embodiment of FIGS. 8A and 8B assume a total amount borrowed 831 of $48,999 and a 10 year (120 month) repayment term, e.g., 120 months after a final funding event. The levelized payment (L) associated with T.H.E. Payment Plan, as described in this sequence embodiment, is $404 as shown in interfaces 800 and 801 (in section 840 and at fields 837 and 838). As shown in section 840, the first levelized payment (shown as "Beg Monthly Payment") is to be made in October of 2005 (shown as "10/1/2005), e.g., about one month after a first loan disbursement in September of 2005, and a final payment (shown as "Ending Monthly Payment") is in the same amount ($404). It is noted that the interest rate used in determining the monthly payment amounts associated with the payment plans shown in FIGS. 8A, 8B, was 6.4%. The interest rate associated with the various payment plans may vary. In various embodiments, program instructions can be executed to automatically update the fields associated with the various viewable interfaces, e.g., 800, 801, and 900, based on different interest rates. In various embodiments, the interest rate used to determine the levelized payments associated with T.H.E. Payment Plan is the federal PLUS interest rate.

FIG. 12C illustrates another formula 1230 that can be used to determine the amount of a levelized payment (L) associated with a levelized payment plan, e.g., T.H.E. Payment Plan or The Family Budget Plan, according to embodiments of the present disclosure. The levelized payment formula 1230 assumes that a third party, e.g., a school, financial institution, a relative, etc., is to pay the in-school interest associated with a loan for at least a portion of the time while a student is enrolled at a school. As used herein, in-school interest refers to interest that accrues on a borrowed amount during a student's enrollment at a school. In some embodiments of the present disclosure, schools or other third parties may pay in-school interest on a portion of the total amount borrowed. That is, a third party may agree to pay the in-school interest on loan amounts up to a maximum amount, e.g., $10,000, $25,000, $50,000, etc. Alternatively, a third party may agree to pay a percentage of the in-school interest.

For example, some educational institutions may offer to pay all of the in-school interest associated with a borrowing amount while a student is enrolled at the school. Some schools' representatives may offer to pay the in-school interest in order to lower the levelized payment amount (L) associated with a levelized payment plan (to make the cost of attending the particular school more suitable to a family's financial tolerance or to make the cost appear more affordable, for example). If a third party, e.g., a school, pays the in-school interest, the resulting levelized payment (L), as determined by using formula 1230, is lower than the levelized payment (L), as determined by using formula 1220. Program instructions can be executed to display the resulting lower levelized payment (L), as determined by using formula 1230, to a viewable interface, e.g., 800.

The levelized payment (L) formula 1230 can be represented as:

$$L = \frac{[A * I * (I+1)^R]}{(M * I + 1) * (I+1)^R - 1}$$

where A is the total of the disbursements to be made, e.g., $80,000, I is an interest rate, e.g., a monthly rate, M is a period of time, e.g., in months, that in-school interest is to be paid by a third party (e.g., about 44 months if the in-school interest is paid for eight semesters), and R is the period of time, e.g., in months, in the repayment term. As used herein, the repayment term (R) refers to the period for repayment after a final disbursement is made. The repayment term (R) is generally 10 years (120 months) or twenty years (240 months), but embodiments of the present disclosure are not so limited, i.e., repayment terms of 5 years, 15 years, etc. are within the scope of the present disclosure.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the disclosure require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for education planning, comprising:
    collecting, by a computing device, information associated with a cost of obtaining an education and information associated with funding the cost;
    determining, by the computing device, an amount to be financed by using the information associated with the cost of obtaining the education and the information associated with funding the cost; and
    providing, by the computing device, a payment plan for financing the amount to be financed, the payment plan including a levelized payment to be made at a number of intervals for a repayment term, wherein the levelized payment (L) is determined by using a net present value (V) associated with more than one funding event over the course of an education program;
    wherein the levelized payment (L) is determined in association with a formula having various factors including:
        the amount to be financed (A);
        an interest rate (I) associated with the more than one funding event;
        a repayment term (R); and
        a length of time (M) in which a party other than the first party is paying a portion of interest associated with the amount to be financed, and wherein the formula is:

$$L = \frac{[A*I*(I+1)^R]}{(M*I+1)*(I+1)^R - 1}.$$

2. The method of claim 1, wherein the method includes determined, by the computing device, the net present value (V) associated with the more than one funding event by summing a present value ($P_z$) for each of the funding events by using a formula that includes:
    an amount (a) of a current funding event (z);
    an interest rate (i) associated with the current funding event (z); and
    a length of time (D) from a first funding event to the current finding event (z), and wherein the formula is:

$$P_z = \frac{a}{(i+1)^D}.$$

3. The method of claim 1, wherein the levelized payment includes an equal fixed monthly payment such that a balance of the amount to be financed is zero at the end of the repayment term, and wherein the method includes establishing the fixed equal monthly payment before the first funding event.

4. The method of claim 1, wherein the method includes determining the levelized payment based on the repayment term staffing while a first party is enrolled in the education program.

5. The method of claim 1, wherein collecting information associated with funding the cost includes collecting information associated with funding sources including:
    a student;
    a family; and
    an educational institution.

6. The method of claim 1, wherein the method includes providing, by the computing device, an option to allocate the amount to be financed between a first party and at least one additional party.

7. The method of claim 6, wherein the method includes adjusting, by the computing device, the levelized payment based on the allocation of the amount to be financed if the option to allocate is used.

8. The method of claim 7, wherein the method includes providing, by the computing device, a comparison of the payment plan to at least one additional funding plan.

9. The method of claim 8, wherein the method includes:
    receiving the information associated with the cost of obtaining the education and the information associated with funding the cost to a viewable interface; and
    displaying the comparison to the viewable interface.

10. A computer readable medium having computing device executable program instructions stored thereon to cause a computing device to perform a method, comprising:
    determining a first cost associated with attending an educational institution for an extended period;
    determining a funded amount that comprises an amount of the first cost to be funded from sources that include:
        student sources;
        family sources; and
        educational institution sources;
    determining a first borrowed amount to be borrowed by a first party to pay at least a portion of the difference between the first cost and the funded amount, wherein the first borrowed amount is disbursed in more than one funding event; and
    determining and displaying a payment plan to repay the first borrowed amount, wherein the payment plan includes a levelized payment determined using a formula that includes:
        a selected portion of the first borrowed amount (A);
        an interest rate (I) associated with the more than one funding event;
        a repayment term (R); and
        a length of time (M) in which a party other than the first party is paying a portion of interest associated with the selected portion of the first borrowed amount and wherein the formula is:

$$L = \frac{[A*I*(I+1)^R]}{(M*I+1)*(I+1)^R - 1}.$$

11. The medium of claim 10, wherein the method includes determining the levelized payment based on a first payment coming due a predetermined time after a first funding event, wherein the predetermined time is less than one academic school year.

12. The medium of claim 10, wherein the method includes displaying a comparison of the payment plan to one or more different funding plans, and wherein the comparison includes information selected from the group including:
   information on an amount of a number of payments for each funding plan;
   information on the date on which a first payment is due for each funding plan;
   information on a total amount that is to be paid for each funding plan; and
   information on a payment amount to be paid while a second party is enrolled at the educational institution for each funding plan.

13. The medium of claim 12, wherein the method includes providing access to particular online loan applications based on a selected funding plan.

14. The medium of claim 10, wherein the method includes determining a second borrowed amount to be borrowed by a second party to pay at least a portion of the difference between the first cost and the funded amount by allocating the difference between the first cost and the funded amount among the first party and the second party if the first party does not choose to fully pay the difference between the first cost and the funded amount.

15. A computer readable medium having computing device executable program instructions stored thereon to cause a computing device to perform a method, comprising:
   determining a difference between a cost of a multi-year degree program at an educational institution and funds available for education;
   displaying a selected portion of the difference as a first borrowed amount to be borrowed by a first party, wherein the selected portion to be borrowed is to be disbursed in more than one scheduled funding event associated with one or more academic years of the educational institution;
   displaying a number of payment plans for paying back the selected portion, wherein at least one of the payment plans includes a levelized payment, and wherein the levelized payment includes a monthly equal fixed payment;
   wherein the levelized payment (L) is determined in association with a formula having various factors including:
      the selected portion of the difference to be borrowed (A);
      an interest rate (I) associated with the more than one scheduled funding events;
      a repayment term (R); and
      a length of time (M) in which a party other than the first party is paying a portion of interest associated with the selected portion of the difference to be borrowed, and wherein the formula is:

$$L = \frac{[A * I * (I + 1)^R]}{(M * I + 1) * (I + 1)^R - 1}.$$

16. The medium of claim 15, wherein the method includes determining the levelized payment by using a net present value associated with the more than one scheduled funding events.

17. The medium of claim 15, wherein a first levelized payment is made before a first of the more than one scheduled finding events occurs.

18. A system, comprising:
   a processor;
   a memory coupled to the processor; and
   program instructions storable on the memory and executable by the processor to:
      provide a number of input fields to receive a cost of obtaining a multi-year education and funds available for funding the cost;
      determine a difference between the cost and the funds available for funding the cost;
      display a number of payment plans associated with a borrowing amount to cover the difference, wherein at least one of the number of payment plans includes a levelized payment, and wherein the levelized payment is determined using a net present value of more than one funding event associated with the borrowing amount;
      provide for allocating the borrowing amount between at least two parties; and
      update at least one of the displayed number of payment plans when the borrowing amount allocation changes;
   wherein the levelized payment (L) is determined in association with a formula having various factors including:
      a selected portion of the borrowing amount (A) to be borrowed by a first party;
      an interest rate (I) associated with a number of scheduled funding events;
      a repayment term (R); and
      a length of time (M) in which a party other than the first party is paying portion of interest associated with the selected portion of the borrowing amount to be borrowed by the first party, and wherein the formula is:

$$L = \frac{[A * I * (I + 1)^R]}{(M * I + 1) * (I + 1)^R - 1}.$$

19. The system of claim 18, wherein the program instructions can be executed to load various information from a remote database including financial aid award information associated with the multi-year education.

20. The system of claim 18, wherein the program instructions can be executed to:
   provide an input field to receive a selectable field of study;
   determine an expected annual income based on a selected field of study; and
   update the expected future income if another selectable field of study is selected.

21. The system of claim 18, wherein the program instructions can be executed to display a recommended maximum monthly payment obligation for a student based on an amount borrowed by the student and an expected monthly income.

22. The system of claim 18, wherein the first party is a student and wherein the party other than the first party is an educational institution.

* * * * *